(12) United States Patent
Chen et al.

(10) Patent No.: US 7,926,027 B2
(45) Date of Patent: Apr. 12, 2011

(54) BINDING TO BUSINESS OBJECTS AND WEB SERVICES

(75) Inventors: John Z Chen, Woodinville, WA (US); Joseph P Stegman, Newcastle, WA (US); Karol Zadora-Przylecki, Sammamish, WA (US); Steven M Lasker, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1122 days.

(21) Appl. No.: 10/968,693

(22) Filed: Oct. 19, 2004

(65) Prior Publication Data
US 2006/0085342 A1    Apr. 20, 2006

(51) Int. Cl.
G06F 9/44 (2006.01)
(52) U.S. Cl. .......................................... 717/106; 715/762
(58) Field of Classification Search .................. 715/744, 715/762, 769, 866; 717/106, 108
See application file for complete search history.

(56) References Cited

U.S. PATENT DOCUMENTS

| | | | |
|---|---|---|---|
| 5,862,379 A | 1/1999 | Rubin et al. | |
| 6,023,271 A * | 2/2000 | Quaeler-Bock et al. | 715/866 |
| 6,025,836 A * | 2/2000 | McBride | 715/750 |
| 6,401,099 B1 | 6/2002 | Koppolu et al. | |
| 6,477,527 B2 | 11/2002 | Carey et al. | |
| 6,631,381 B1 | 10/2003 | Couch et al. | |
| 6,631,497 B1 * | 10/2003 | Jamshidi et al. | 715/205 |
| 6,760,902 B1 * | 7/2004 | Ott | 717/113 |
| 7,062,718 B2 * | 6/2006 | Kodosky et al. | 715/771 |
| 7,194,692 B2 * | 3/2007 | Marcos et al. | 715/744 |
| 7,552,170 B2 * | 6/2009 | Owen et al. | 709/203 |
| 2003/0226111 A1 * | 12/2003 | Wirts et al. | 715/514 |
| 2004/0001092 A1 * | 1/2004 | Rothwein et al. | 345/763 |
| 2004/0017392 A1 | 1/2004 | Welch | |
| 2004/0049736 A1 | 3/2004 | Al-Azzawe et al. | |
| 2004/0250213 A1 * | 12/2004 | Shalabi et al. | 715/762 |
| 2005/0066287 A1 * | 3/2005 | Tattrie et al. | 715/769 |
| 2005/0172261 A1 * | 8/2005 | Yuknewicz et al. | 717/106 |

OTHER PUBLICATIONS

Felix Golubov, "XAmple XML Editor. User Manual", 2003, retrieved from: http://web.archive.org/web/20030809204704/http://www.felixgolubov.com/XMLEditor/user-manual.html.*
Clifton, "A Dynamically Generated XML Data Editor", 2003, retrieved from: http://www.codeproject.com/KB/system/xmldataeditor.aspx.*
Steve Lasker, "Drag-Once Databinding", Aug. 20, 2004, CoDe Magazine, 2004—September/October, retrieved from: http://www.code-magazine.com/Article.aspx?quickid=0409051.*

(Continued)

Primary Examiner — Lewis A Bullock, Jr.
Assistant Examiner — Jue Wang
(74) Attorney, Agent, or Firm — Workman Nydegger

(57) ABSTRACT

A system and method for method facilitating design-time data binding of business object(s) and/or web service(s) is provided. Developer(s) can specify their own class(es) that do not require specific inheritance, interface implementation or default public constructors.
The system includes a binding component that generates control information associated with control(s) based, at least in part, upon binding information associated with an entity (e.g., object, business object and/or web service). The system further includes a control generator that generates control(s) of a form associated with the entity based upon the generated by the binding component.
The binding component can utilize public property(ies) of the entity (e.g., object, business object and/or web service). The entity can represent a hierarchy of objects that drill down (e.g., endlessly), including circular relationships.
At design-time, a user (e.g., developer) can drag the root of an object (e.g., a business object and/or a web service) onto a form. Control(s) associated with the form are created by the system based on a schema of the object.

8 Claims, 12 Drawing Sheets

OTHER PUBLICATIONS

Lhotka, "15 Seconds: Windows Forms Object Data Binding in .NET 2.0", Jun. 2004, retrieved from www.15seconds.com article archive.*

G. Gottlob, G. Kappel, and M. Schrefl. Semantics of Object-oriented Data Models—The Evolving Algebra Approach. LNCS 504, pp. 141-160, Springer 1991.

M. Theodorakis, et al. A Theory of Context in Information Bases. Technical Report 216, ICS.FORTH—Hellas, Mar. 1998. 32 pages.

Rod Stephens, Binding Controls with VB.NET, May 24, 2002, 5 pages.

* cited by examiner

BINDING TO BUSINESS OBJECTS AND WEB SERVICES

TECHNICAL FIELD

The subject invention relates generally to software development tools, and more specifically, to a system for data binding business object(s) and/or web service(s).

BACKGROUND OF THE INVENTION

Software vendors are continually advancing the latest in development tools for users to take advantage of software made available to consumers. Typically, such tools require some level of familiarity by developer with the tool(s) language and structure in order to use the development tool(s) and develop the appropriate interface. However, the rapid evolution in which such development frameworks are manufactured and sold impact the speed with which such tools can be understood and used to provide the software for which they are created. Developers are still left spending an inordinate amount of time learning and struggling with the development environment in order to provide a suitable product for a customer.

Conventional development tools have supported data binding to object(s); however, there was limited design-time support. In order to enable design-time support, developer(s) implemented base class(es) that inherited from a specific base class and/or implemented several interface(s). The addition of these base class(es) and/or interface(s) was time-consuming and added limited, if any, value at run-time.

SUMMARY OF THE INVENTION

The following presents a simplified summary of the subject invention in order to provide a basic understanding of some aspects of the subject invention. This summary is not an extensive overview of the subject invention. It is not intended to identify key/critical elements of the subject invention or to delineate the scope of the subject invention. Its sole purpose is to present some concepts of the subject invention in a simplified form as a prelude to the more detailed description that is presented later.

The subject invention provides for a system and method facilitating design-time data binding of business object(s) and/or web service(s). Developer(s) can specify their own class(es) that do not require specific inheritance, interface implementation or default public constructors.

In accordance with an aspect of the subject invention, a system that facilitates entity data binding is provided. The system includes a binding component that generates control information associated with control(s) based, at least in part, upon binding information associated with an entity (e.g., object, business object and/or web service). The system further includes a control generator that generates control(s) of a form associated with the entity based upon the generated by the binding component.

In one example, the binding component utilizes public property(ies) of the entity (e.g., object, business object and/or web service). For example, the entity can represent a hierarchy of objects that drill down (e.g., endlessly), including circular relationships. The hierarchy can represent sub-lists of control(s) and/or one-to-one sub-object(s).

At design-time, a user (e.g., developer) can drag the root of an object (e.g., a business object and/or a web service) onto a form. Control(s) associated with the form are created by the system based on a schema of the object.

Optionally, developer(s) can drill down into sub-collection(s) and/or sub-object(s) of the root object. The system captures the hierarchy of the object that was introduced to the form designer and creates the associated relationship(s) on the form. For example, a developer can scroll through and modify a list of customers, while related lists are updated. In addition, controls can similarly be updated.

To the accomplishment of the foregoing and related ends, certain illustrative aspects of the subject invention are described herein in connection with the following description and the annexed drawings. These aspects are indicative, however, of but a few of the various ways in which the principles of the subject invention may be employed and the subject invention is intended to include all such aspects and their equivalents. Other advantages and novel features of the subject invention may become apparent from the following detailed description of the subject invention when considered in conjunction with the drawings.

DETAILED DESCRIPTION OF THE INVENTION

Figure 1:
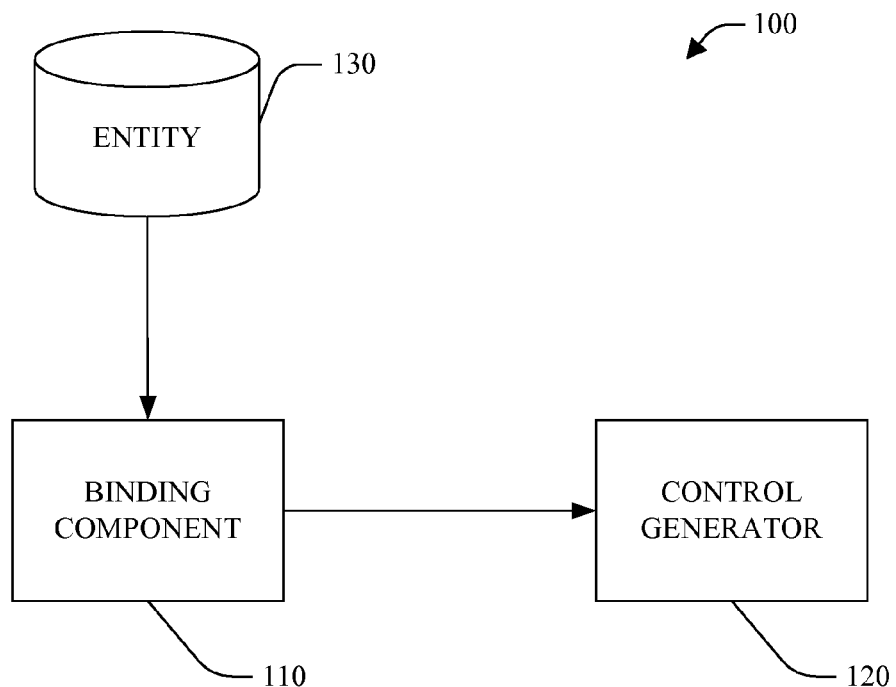
FIG. 1 is a block diagram of a system that facilitates entity data binding in accordance with an aspect of the subject invention.

The subject invention is now described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

As used in this application, the terms "component," "handler," "model," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory) and memory stick in accordance with the subject invention.

Referring to FIG. 1, a system 100 that facilitates entity data binding in accordance with an aspect of the subject invention. The system 100 includes a binding component 110 and a control generator 120.

The system 100 can be employed at design-time, for example, to facilitate the design of application(s) employing business object(s) and/or web service(s). A user (e.g., developer) can drag the root of an entity (e.g., a business object and/or a web service) onto a form on a design surface of a development tool (e.g., designer). Control(s) associated with the form are created by the system 100 based on a schema of the entity. The system 100 is extensible in that a user can create entity(ies) (e.g., object(s)) of the user's own type with the system 100 facilitating data binding to the entity(ies) in client application(s).

In one example, the binding component utilizes public property(ies) of the entity (e.g., object, business object and/or web service). For example, the entity can represent a hierarchy of objects that drill down (e.g., endlessly), including circular relationships. The hierarchy can represent sub-lists of control(s) and/or one-to-one sub-object(s).

With the system 100, at design-time, a user (e.g., developer) can establish data binding to entity(ies) (e.g., business object(s) and/or web service(s)) quickly by (1) creating entity(ies) with public property(ies); and, (2) dragging the entity from a data source onto a form on the design surface. Thereafter, data binding of the entity to control(s) of the form is performed by the system 100 with substantially no user input. Data binding can include, for example, creation of control(s), label(s) for the control(s) and/or naming of the control(s) based on the entity(ies)' bound property(ies). Thus, a developer can focus on the specific application and not on implementing design-time functionality for entity(ies) (e.g., business object(s) and/or web service(s)). The system 100 is a significant improvement over conventional design-time system(s) in which a user (e.g., developer) typically wrote specific code to implement design-time support for data binding which had no value at runtime.

The binding component 110 generates control information associated with at least one control. The control information can be generated based, at least in part, upon binding information associated with an entity. The binding information can include, for example, public property(ies) associated with the entity.

The control generator 120 generates control(s) associated with a form employed with the entity based upon the control information generated by the binding component. The control(s) can include for example, a text box, a check box, a label etc.

For example, the system 100 can be employed by a user (e.g., developer) developing an application that utilizes an entity (e.g., business object and/or web service). The entity includes on or more public properties to which the user desires to bind to control(s) of a form on a design-time surface. In this example, the system 100 employs a Customer BindingSource through which the system 100 can view a Type and obtains its public property(ies) without actually instancing the object on the form designer. The DataGridView is bound to the Customer object through the BindingSource. The BindingSource then represents the bindable items as substantially any public property of the Customer.

In one example, the system 100 supports different types of data sources and each type is handled slightly differently:

Typed DataSets

In one example, Typed DataSet(s) defined in the current project (e.g., with an XSD file) are automatically displayed in the data source display area. If a user has defined the user's own class that inherits from DataSet, it will not be added in this example. However, Object Data Source type can be utilized. Each DataTable of the DataSet will be listed with the corresponding list of columns.

Web Services

Similar to DataSets, any Web Service references are displayed in the Data Sources Window. The system 100 evaluates web method(s) and displays the public property(ies) of the object returned by each method. For example, the GetBook method on a Web Service may return a Book object. The data source display area displays the public properties of the Book object within the Data Sources Window.

User Defined Objects

The display and implementation of user-defined object(s) (e.g., business object(s)) are facilitated through the inclusion of public properties.

Drag & Drop Interactions

Figure 2:
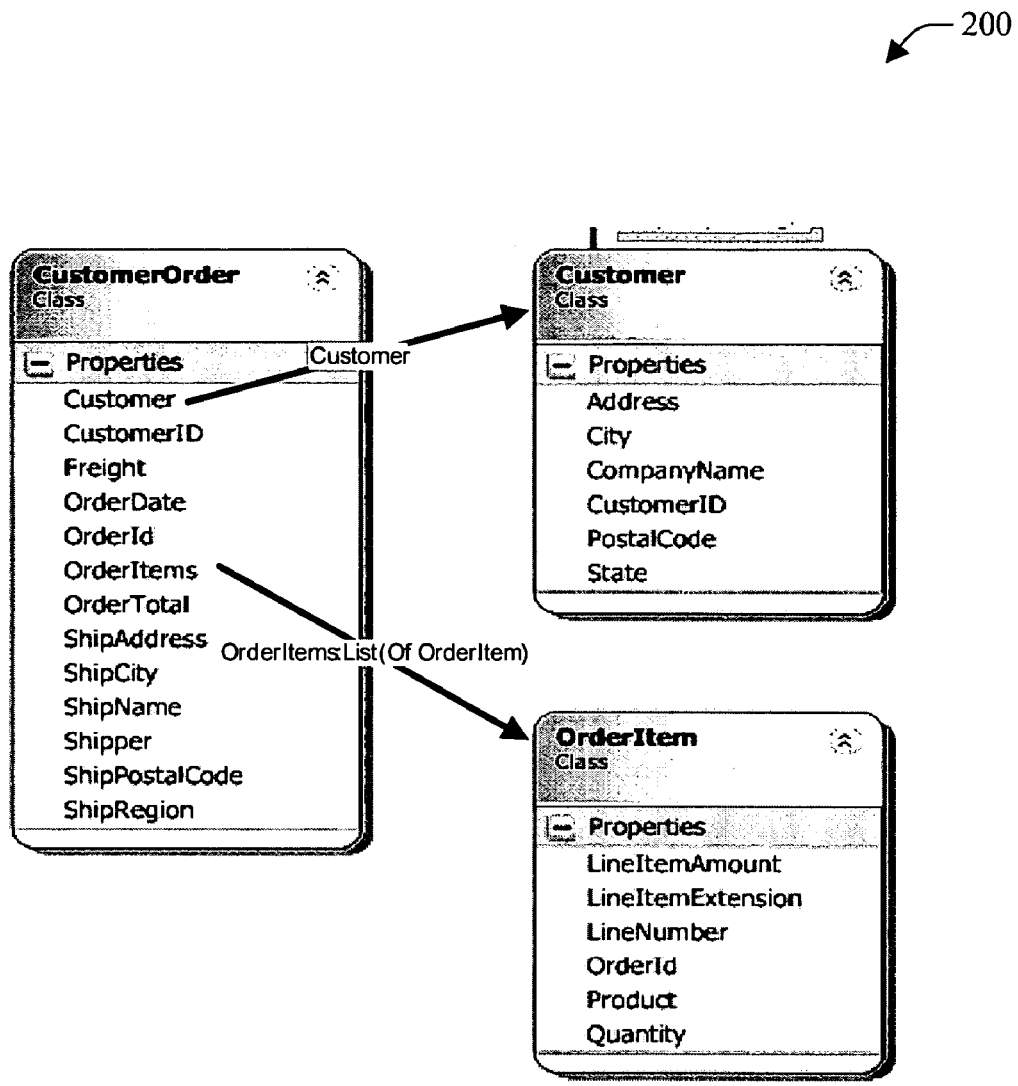
FIG. 2 is a class diagram of an exemplary class in accordance with an aspect of the subject invention.
Figure 3:
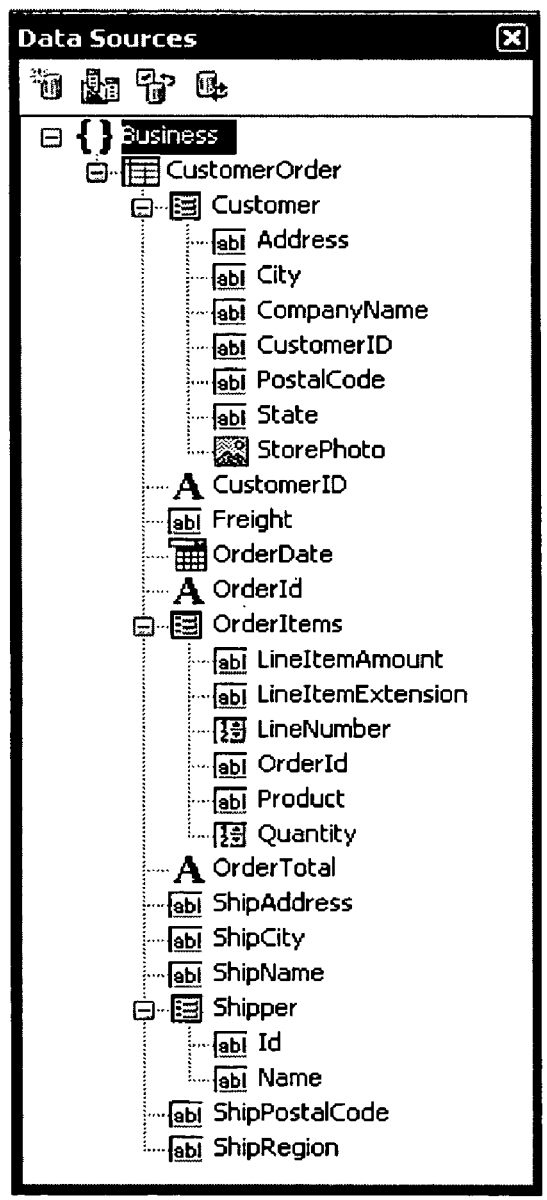
FIG. 3 is a data source display area representation of the exemplary class of FIG. 2 in accordance with an aspect of the subject invention.

Referring to FIGS. 2 and 3, a class diagram 200 of an exemplary class and representation in a data source display area 300 of the exemplary class are illustrated.

The class diagram 200 includes several interesting properties:

CustomerOrder.Customer:Customer

CustomerOrder.OrderItems:Generic.List(Of OrderItem)
CustomerOrder is a 1:1 association of a single customer for a given CustomerOrder. CustomerOrder.OrderItems is a GenericList of OrderItem's.

In accordance with an aspect of the present invention, the system 100 can be employed with a data source display area to facilitate dragging entity(ies) (e.g., object(s)) to a form as a DataGridView, [List Controls]. Further, the system 100 can be employed to facilitate dragging entity(ies) to a form individual control(s) [Details] which creates specific control(s) for each property/column of the selected object. The control created can be specified by selected DropType of an associated property/column. If [None] is selected, no control is created. For each control created, a corresponding label can be created by the system 100. Finally, the system 100 can be employed to facilitate dragging of an individual control.

Drop Type

An aspect of the present invention provides for one and/or a plurality of potential control(s) to be created on a designer surface. In example, Drop Types are a list of potential controls that can be dropped on the designer surface. In this example, there are two categories of Drop Types:

Object Drop Types:
Represent the class or DataTable. In the above example: CustomerOrder, Customer and OrderItems
Property Drop Types:
Any property of an object that doesn't represent another user defined object.
In the above example, CustomerID, Address and StorePhoto have Property Drop Types.

Drop Type is only used when creating controls. When dragging a selection from the data source display area onto existing controls, the Drop Type is ignored.

Figure 4:
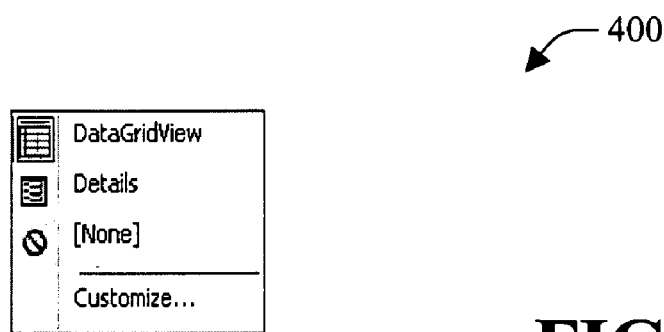
FIG. 4 is a diagram of an exemplary user interface identifying exemplary drop types in accordance with an aspect of the subject invention.

Referring briefly to FIG. 4, an exemplary user interface 400 identifying exemplary drop types in accordance with an aspect of the subject invention is illustrated. The user interface 400 includes DataGridView, Details, [None] and Customize which correspond to object drop types:

[List] Controls such as the DataGridView or other user defined controls that implement, for example, the ComplexBindingAttribute

[Details] Controls. This is a special selection that indicates that the DropType indicated on each property will be created.

[None] If the parent node is dragged to the form, nothing would be created.

[Customize] A shortcut to a dialog that allows the developer to customize the list of controls associated with each datatype.

Nullable Type

In one example, an object which can be of Nullable Type is exposed. However, when data binding is performed by the system 100, the entity (e.g., object) is bound to the nullable property and not the value property of the nullable type.

Figure 5:
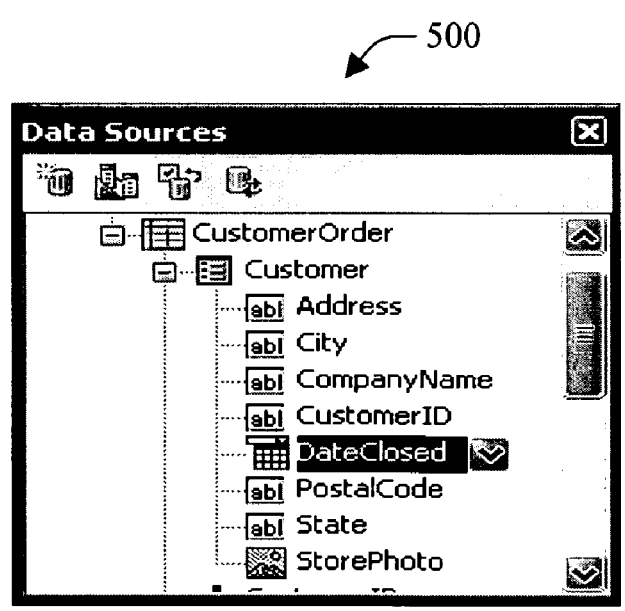
FIG. 5 is a diagram of an exemplary user interface in accordance with an aspect of the subject invention.

In another example, an object which can be of Nullable Type is displayed as collapsed. Referring to FIG. 5, an exemplary user interface 500 in accordance with an aspect of the subject invention is illustrated. In this example, the object DateClosed is displayed as collapsed. User interface 500 results in a simplified presentation compared with user interface 600.

Behavior of 1:1 Objects

Figure 6:
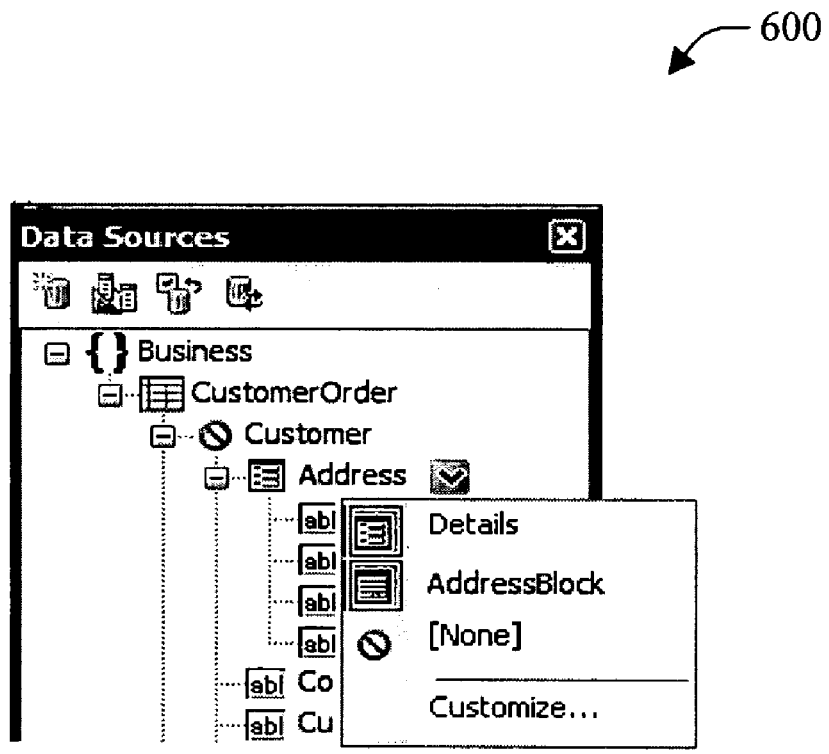
FIG. 6 is a diagram of an exemplary user interface in accordance with an aspect of the subject invention.

Referring to FIG. 6, an exemplary user interface 600 in accordance with an aspect of the subject invention is illustrated. In this example, when an entity (e.g., object, business object and/or web service) exposes a property of a user define type, for example, CustomerOrder.Customer, the system 100 treats it differently then a collection of objects, for example, CustomerOrder.OrderItems.

In this example, since the CustomerOrder.Customer property does not represent a list, the system 100 does not display [List] control(s) as possible Drop Types. In addition to [Details], the system 100 can also display control(s), if any, associated with [Other], as discussed below.

In one example, when object(s) are initially added to the data source display area, the default Drop Type for 1:1 controls is [Details].

Drag & Drop Behavior of Object with 1:1 Objects

Figure 7:
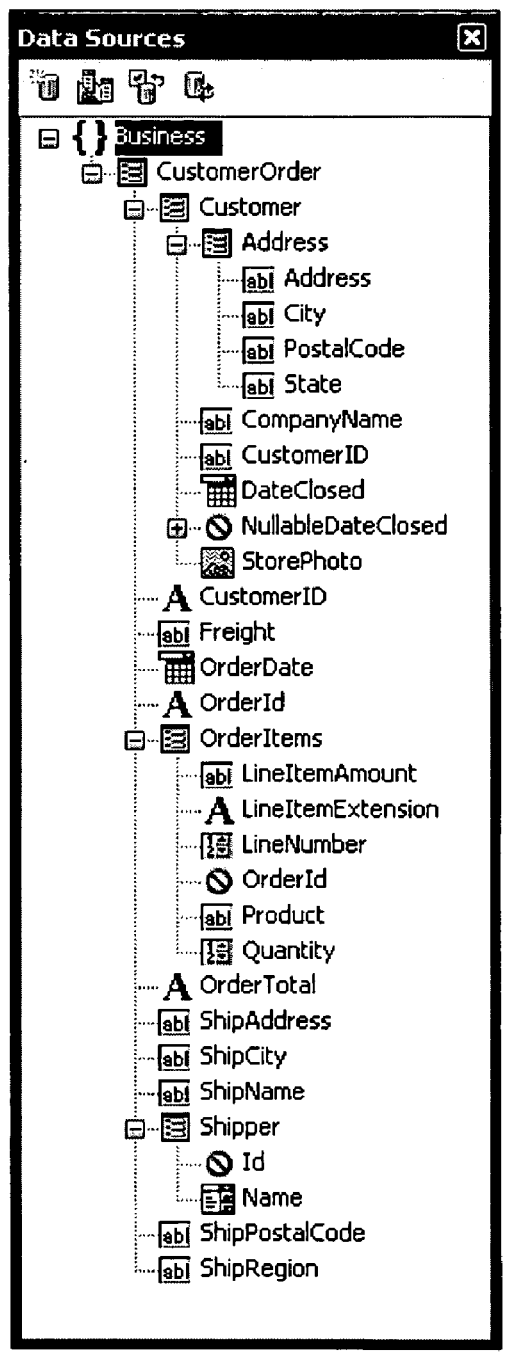
FIG. 7 is a diagram of an exemplary user interface associated with a data source display area in accordance with an aspect of the subject invention.

This section describes exemplary behavior that the system 100 can employ with respect to dragging of an object that contains 1:1 Object(s). First, turning to FIG. 7, an exemplary user interface 700 associated with a data source display area in accordance with an aspect of the subject invention is illustrated. In this example:

CustomerOrder DropType=Details
Customer=DropType of Details
Customer.Address=DropType of Details
OrderItems=DropType of Details
Shipper=DropType of Details In a first scenario, when a user drags the object "CustomerOrder" to the designer surface (e.g., form designer), controls are created for:

All simple properties of CustomerOrder
All Simple controls of CustomerOrder.Customer
All Simple controls of Customer.Address
Shipper.Name is created as a ComboBox
NullableDateClosed and Shipper.Id are not created as they are set to [None] as a drop type.

Additionally, no controls are created for OrderItems as OrderItems is represented as a List(Of OrderItem)—in this example, the system 100 does not create more than one list/BindingSource collection of items at a time.

Further, controls are created for Customer, Customer.Address and Shipper as they are nested properties of the CustomerOrder object. Additionally, a CustomerOrderBindingSource is created to represent the CustomerOrder object.

Thus, the system 100 establishes data bindings of the standard controls as follows:

---
Me.FreightTextBox.DataBindings.Add(New
System.Windows.Forms.Binding("Text",
Me.CustomerOrderBindingSource, "Freight", True))

---

Data bindings of the nested controls are established by the system 100 as the following:

---
Me. CompanyNameTextBox.DataBindings.Add(New
System.Windows.Forms.Binding("Text",
Me.CustomerOrderBindingSource,
"Customer.CompanyName", True))
Me.AddressTextBox.DataBindings.Add(New
System.Windows.Forms.Binding("Text",
Me.CustomerOrderBindingSource,
"Customer.Address.AddressLine1", True))

---

Dragging Nested 1:1 Objects

Figure 8:
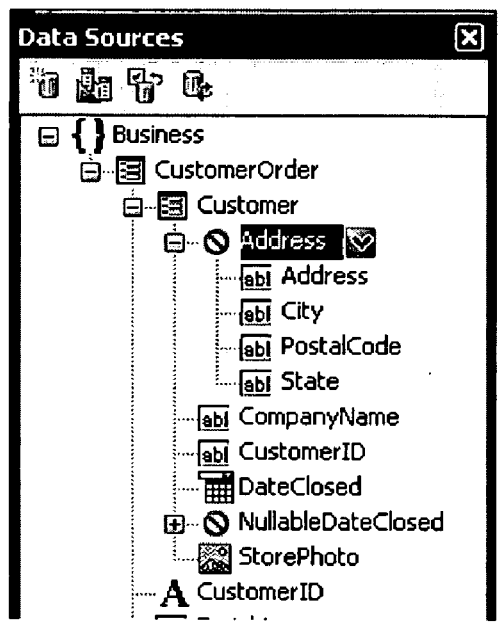
FIG. 8 is a diagram of an exemplary user interface associated with a data source display area in accordance with an aspect of the subject invention.

Referring to FIG. 8, an exemplary user interface 800 associated with a data source display area in accordance with an aspect of the subject invention is illustrated. In this example, CustomerOrder.Customer.Address has a DropType of none. In a first example, when a user drags the object "CustomerOrder", controls are created for Customer.CompanyName and, CustomerId, and, none of the "Customer.Address" controls are created. Additionally, CustomerOrderBindingSource is created:

---
Me.CustomerOrderBindingSource.DataSource =
GetType(Business.CustomerOrder)

---

In a second example, when a user drags Address.State to the form, a StateTextBox is created. This occurs even though Address has DropType set to None as the user did not drag the Address object—the user dragged the property. Data bindings of the text box can be established by the system 100 as the following:

```
Me.StateTextBox.DataBindings.Add(New
System.Windows.Forms.Binding("Text",
Me.CustomerOrderBindingSource,
"Customer.Address.AddressLine1", True))
```

In this example, an AddressBindingSource is not created as the system 100 is aware that that Address is part of the parent CustomerOrder List.

Dragging Nested Lists

Figure 9:
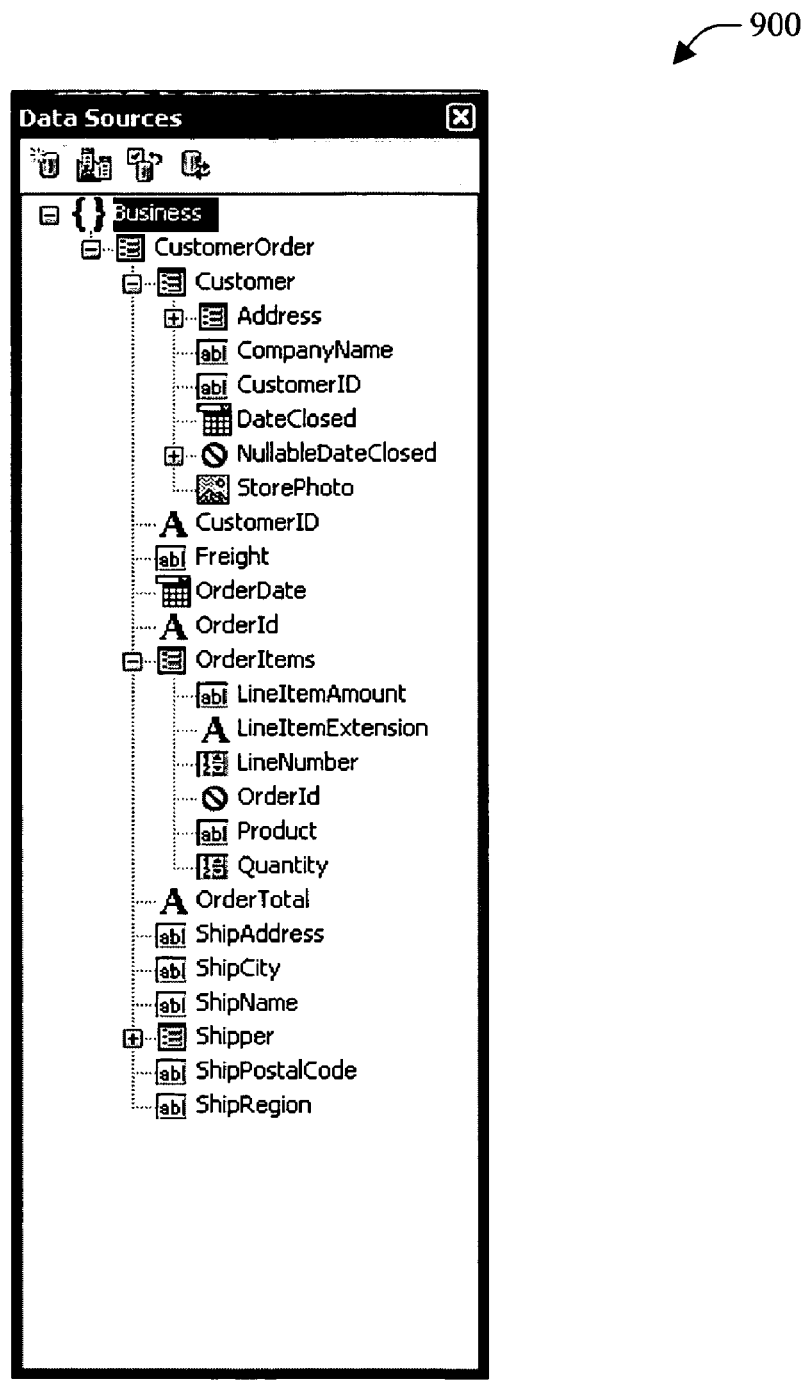
FIG. 9 is a diagram of an exemplary data source display area in accordance with an aspect of the subject invention.

Referring next to FIG. 9, an exemplary data source display area 900 in accordance with an aspect of the subject invention is illustrated. In a first scenario, a child object is dragged first. In this scenario, a user drags Customer to an empty form. Thereafter, Customer and Customer.Address controls are created with the rules discussed previously. The system 100 further creates a CustomerOrderBindingSource and controls under Customer. The CustomerOrderBindingSource is created as this is the first list up the hierarchy found by the system 100.

Next, the user drags CustomerOrder.Freight to the form. Since a CustomerOrderBindingSource exists on the form, the FreightTextBox is bound to the existing CustomerOrderBindingSource.

In a second scenario, a Customer Object is added individually to the Data Sources Window. In this scenario, since the Customer Object was added individually to the data source display area, it becomes a root object. Thus, when the user drags Customer from the root (e.g., rather then dragging from CustomerOrder.Customer), a CustomerBindingSource is created, and the same semantics are followed as discussed previously. In this example, the system 100 is aware of the context from which the entity (e.g., object) was dragged.

In a third scenario, a user drags a child list object first, for example, OrderItems, which is set to [Details] to an empty form. The system 100 creates individual controls and labels for all but the Orderid property. Since OrderItems represents a list, below CustomerOrder, a OrderItemsBindingSource is created. Since OrderItems is the first object on the form, OrderItems is not established as a child of any parent.

Dragging Child List Objects after the Parent

In a fourth scenario, a user drags a child list object(s) after the parent. For example, a user drags CustomerOrder, which is set to [Details], to the form. The system 100 creates relevant controls for CustomerOrder, Customer in accordance with the detail set forth above. Thereafter, the user drags OrderItems, which is set to [Details], to the form. The system 100 creates OrderDetails Controls, except OrderId. The system 100 further creates an OrderDetailsBindingSource established as a child of the CustomerOrderBindingSource. For example:

```
Me.OrderItemsBindingSource.DataSource =
Me.CustomerOrderBindingSource
Me.OrderItemsBindingSource.DataMember =
"OrderItems"
Me.LineItemAmountTextBox.DataBindings.Add(New
System.Windows.Forms.Binding("Text",
Me.CustomerOrderBindingSource, "LineItemAmount",
True))
```

The user then changes OrderId to a DropType of label and drags it to the form. In response, the system 100 creates OrderIdLabel and uses the CustomerOrderBindingSource for it's DataBindings:

```
Me.OrderIdLabel.DataBindings.Add(New
System.Windows.Forms.Binding("Text",
Me.CustomerOrderBindingSource, "OrderId", True))
```

Resolving Binding Sources

In accordance with an aspect of the subject invention, when dragging objects and properties from the data source display area to the Design Surface the system 100 can resolve which BindingSource to use. In one example, BindingSources for a given type can be in one of two states: (1) linked directly to the object/type and/or (2) linked through a relationship of one or more parent BindingSources.

When the BindingSource is linked directly to the object/type, the user is dragging elements of the CustomerOrder object. The system 100 already has knowledge the BindingSource, for example:

```
Me.CustomerOrderBindingSource.DataSource =
GetType(Business.CustomerOrder)
```

Alternatively, the BindingSource can be linked through a relationship of one or more parent BindingSources. In this example, the user is dragging elements of the OrderItems object. Their initial drag source was from OrderItems under the CustomerOrder Object:

```
Me.CustomerOrderBindingSource.DataSource =
GetType(Business.CustomerOrder)
Me.OrderItemsBindingSource.DataSource =
Me.CustomerOrderBindingSource
Me.OrderItemsBindingSource.DataMember =
"OrderItems"
```

In this example, the system 100 examines the context of the source of the drag in order to resolve the BindingSources. In the above example, the user dragged OrderItems from below the CustomerOrderObject. The source context assists the system 100 in identifying a BindingSource having a datasource established as a child of a BindingSource having a DataSource set to a CustomerOrderBindingSource.

The system 100 can continue to review a hierarchical order in order to resolve BindingSources. For example, the CustomerOrder BindingSource can be established as a child of a CustomerBindingSource:

```
Me.CustomerBindingSource.DataSource =
GetType(Business.Customer)
Me.CustomerOrderBindingSource.DataSource =
Me.CustomerBindingSource
Me.CustomerOrderBindingSource.DataMember =
"Orders"
Me.OrderItemsBindingSource.DataSource =
Me.CustomerOrderBindingSource
Me.OrderItemsBindingSource.DataMember =
"OrderItems"
```

Child BindingSource not Found

In one example, when the Drag Source context is a child of a parent, and dropped on a design surface that doesn't contain the parent, the child is created with a BindingSource linked directly.

Linking Child BindingSource to a Parent BindingSource

To link the two BindingSources, the user can simply change the DataSource, DataMember of the OrderItemsBindingSource:

User selects the OrderItemsBindingSource

In the Property Grid the user selects the DataSource and chooses the CustomerOrderBindingSource The user then selects the DataMember and chooses OrderItems The two BindingSources are now linked.

Creating Labels

In one example, DataTable Columns utilize the Column.Caption for the associated Label.Text. Additionally, Objects utilize the DisplayName attribute for the associated Label.Text:

```
<System.ComponentModel.DisplayName("Company
   Name")> _
    Public Property CompanyName( ) As String
```

If the attribute doesn't exist, the system 100 employed the property name.

The text of the label is altered based on the name of the property of the associated control. The system 100 converts property names with capital letters to insert spaces before each capital letter. In addition, underscores "_" are converted to spaces. For example, dragging a property name of FirstName creates a label with its text set to First Name. Similarly First_Name will be First Name. In this example, the case of the property must return back to lower case before the next space would be inserted. For instance a property named ProductID would generated a label with text set to Product ID.

Drag & Drop with [List] Selected

In one example, when dragging a [List] control from the data source display area to the design surface, the system 100 targets the control selected as the [List] Drop Type.

Property Setting on Controls

In this example, the only properties set by the system 100 are the DataSource and DataMember as specified by the Binding Attributes. The system 100 does not create any columns in the DataGridView or any other controls.

DataGridView Support for 1:1 Objects

In the scenario where a user binds a grid to a Customer object, there is additional information in the Address property. It is up to the DataGridView to handle the drop of the information from the DataGridView.

[Other] Controls

Those skilled in the art will recognize that the system 100 can be employed with user created control(s) for complex objects for their own types. By associating a custom control with [Other], developers are able to associate their own custom control with their own type, thus, facilitating extensibility of the system 100.

Figure 10:
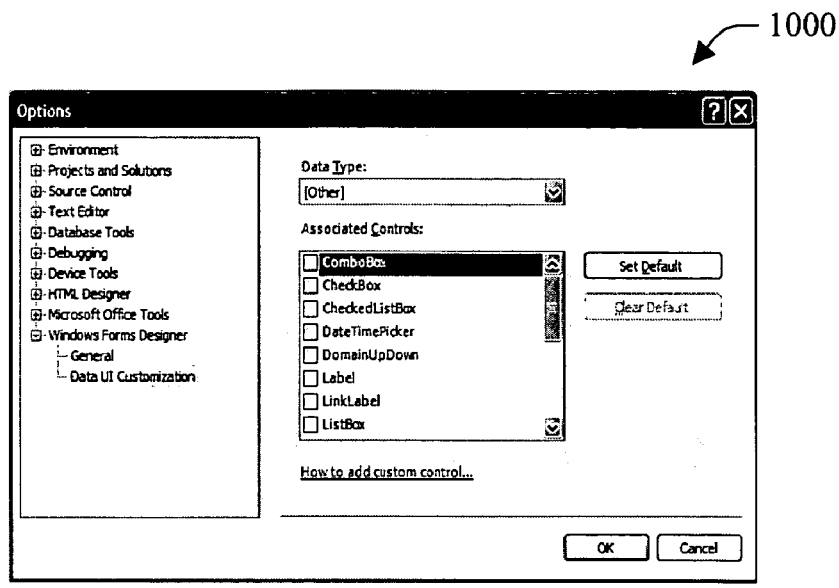
FIG. 10 is a diagram of a user interface in accordance with an aspect of the subject invention is illustrated.

Referring to FIG. 10, a user interface 1000 in accordance with an aspect of the subject invention is illustrated. Through the user interface 1000, a user can associate a custom control with the user's own type.

Figure 11:
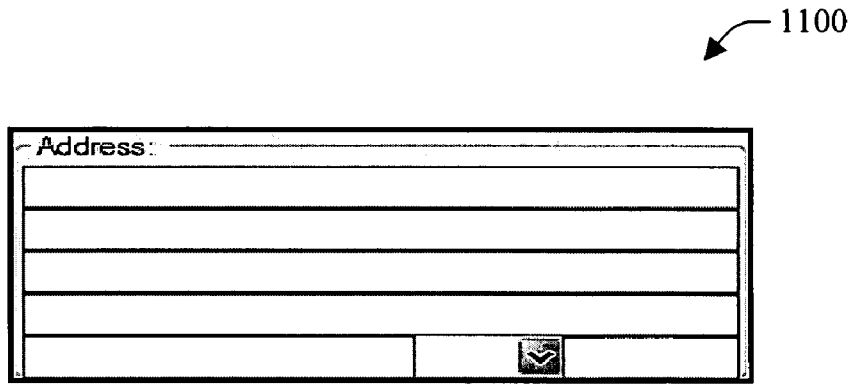
FIG. 11 is a diagram of an exemplary user interface associated with a user control in accordance with an aspect of the subject invention.

Turning to FIG. 11, an exemplary user interface 1100 associated with a user control in accordance with an aspect of the subject invention is illustrated. In this example, a user has created an AddressBlock that incorporates the basic controls associated with an address, for example:

```
<DefaultProperty("Address")> _
Public Class AddressBlock
    Inherits UserControl
    Public Property Address( ) As Address
        Get
            Return _address
        End Get
        Set(ByVal value As Address)
            _address = value
            SetControlValues( )
        End Set
    End Property
    . . .
```

With DataBinding:

```
Me.ShipToAddressAddressBlock.DataBindings.Add(New
System.Windows.Forms.Binding("Address",
Me.CustomerOrderBindingSource,
"Customer.Address", True))
```

Figure 12:
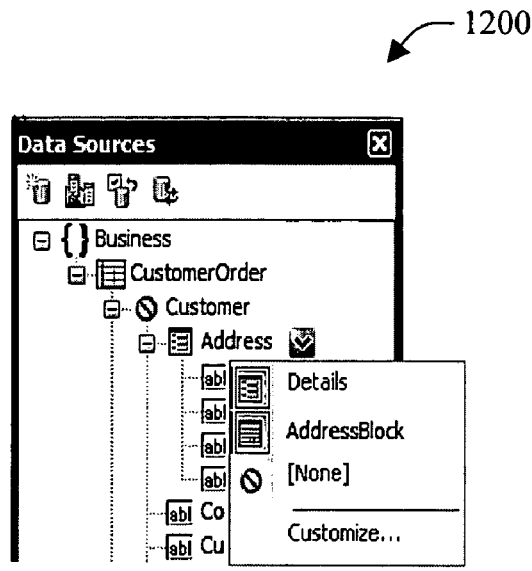
FIG. 12 is a diagram of a user interface in accordance with an aspect of the subject invention.

Using, for example, the user interface 1200 of FIG. 12, the user can associated their AddressBlock control with the [Other] controls.

Drag & Drop with Details and all Properties Set to [None]

Figure 13:
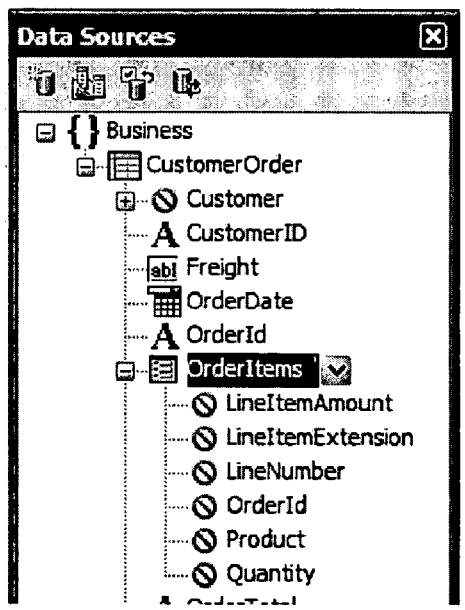
FIG. 13 is a diagram of an exemplary data source display area in accordance with an aspect of the subject invention.

In this example, a developer has set the DropType to [Details], however all the properties are set to [None]. Referring to FIG. 13, an exemplary data source display area 1300 in accordance with an aspect of the subject invention is illustrated. In this example, since the user selected [Details], the system 100 is responsible for creating new controls. In this case, the user receive a Non Drop icon as they hover over the designer. However, as set forth below (e.g., Connect the Dots section), OrderItems can be enabled to be dropped onto any control that enables ComplexBindingAttributes.

"Connect the Dots"

"Connect the Dots" is defined as a user dropping a Drag & Drop Operation onto existing control(s) sited on the designer. When Connect the Dots is active, the DropType is ignored by the system 100. This includes the DropType of the parent object. In one example, the same semantics for resolving relationship BindingSources are utilized by the system 100 as set forth previously.

For example, a user places a label on their designer. The user has an Id property that is set to a drop type of [None]. Thereafter, the user drags the Id property from the data source display area to the Design surface. Because the Drop Type was set to none, the user receives a No Drop icon as they hover over the designer (e.g., provided by the system 100). Further, as the user hovers over the label control, the user receives a valid Drop icon because the Label implements the DefaultBindingAttribute.

Connect the Dots with 1:1 Objects

When a user drags a 1:1 object, such as Customer.Address, the system 100 enables Drop on any control that supports DefaultBindingPropertyAttribute( ). This enables user(s) to bind their user defined objects to their user defined types.

As the same drag of Customer.Address hovers over the designer surface, the system 100 utilizes the DropType to determine whether to create the control specified by the DropType. If DropType is set to [None], the No Drop Icon is displayed. If DropType is set to [Details], the individual controls are created. If DropType is set to Custom Control mapped to [Other], the Custom control is created.

It is to be appreciated that the system 100, the binding component 110, the control generator 120 and/or the entity 130 can be computer components as that term is defined herein.

While portions of exemplary code written in Visual Basic.NET have been included for purposes of explanation, those skilled in the art will recognize that the subject invention can be practiced with a variety of programming language(s) including, but not limited to, C#, C++ and J#. Thus, it is to be further appreciated that any programming language suitable for carrying out the subject invention can be employed and all such programming languages are intended to fall within the scope of the hereto appended claims.

Figure 14:
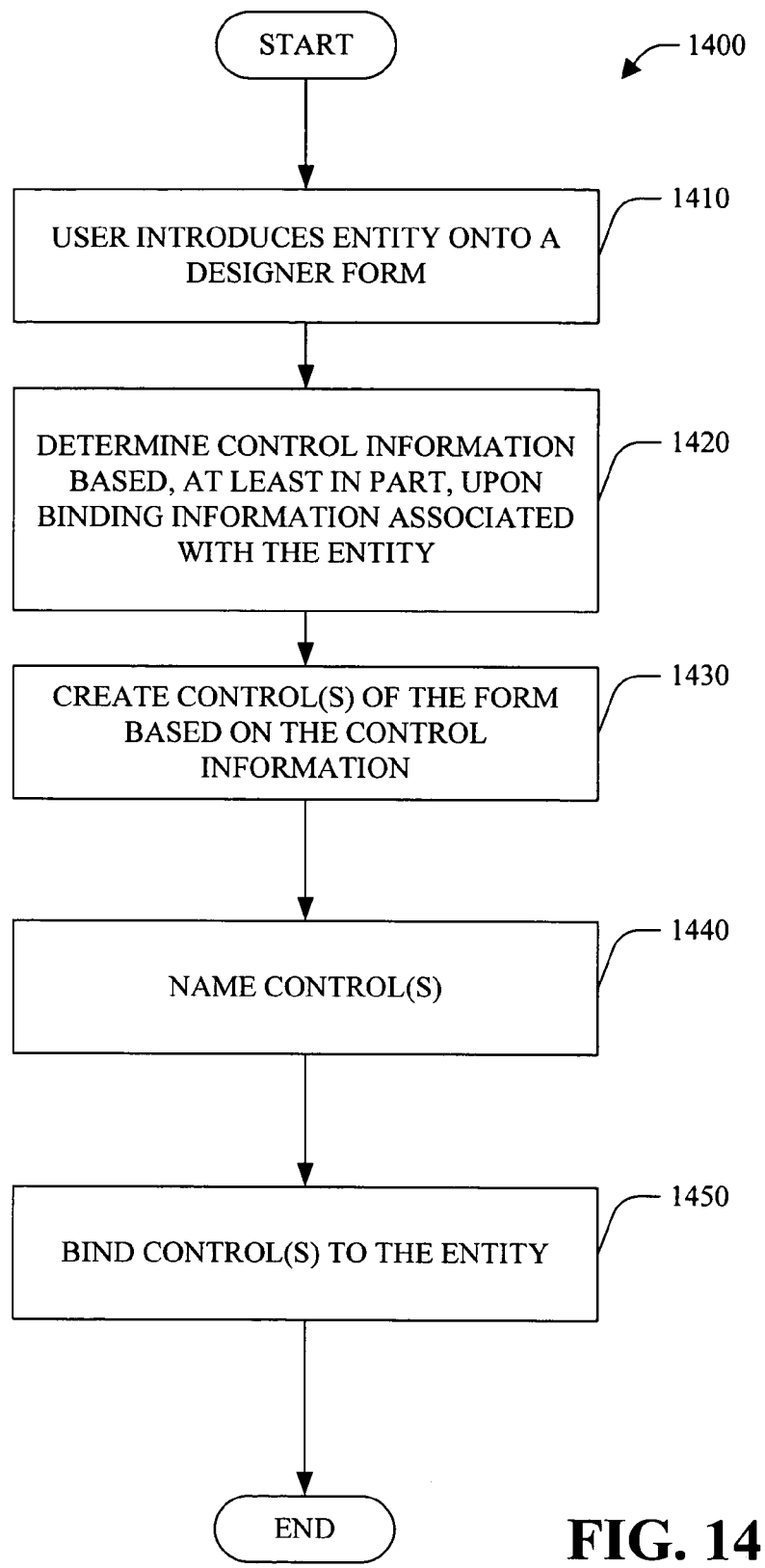
FIG. 14 is a flow chart of a method that facilitates entity data binding in accordance with an aspect of the subject invention.

Turning briefly to FIG. 14, a methodology that may be implemented in accordance with the subject invention are illustrated. While, for purposes of simplicity of explanation, the methodology are shown and described as a series of blocks, it is to be understood and appreciated that the subject invention is not limited by the order of the blocks, as some blocks may, in accordance with the subject invention, occur in different orders and/or concurrently with other blocks from that shown and described herein. Moreover, not all illustrated blocks may be required to implement the methodology in accordance with the subject invention.

The subject invention may be described in the general context of computer-executable instructions, such as program modules, executed by one or more components. Generally, program modules include routines, programs, objects, data structures, etc. that perform particular tasks or implement particular abstract data types. Typically the functionality of the program modules may be combined or distributed as desired in various embodiments.

Referring to FIG. 14, a method that facilitates entity data binding 1400 in accordance with an aspect of the subject invention is illustrated. At 1410, a user introduces an entity (e.g., object, business object and/or web service) onto a designer form. At 1420, control information based, at least in part, upon binding information associated with the entity is determined. For example, public property(ies) of an object can be ascertained. With respect to a web service, web method(s) can be evaluated and public property(ies) of the object returned by the method can be ascertained.

At 1430, control(s) of the form can be created based on the control information. At 1440, the control(s) are named. At 1450, the control(s) are bound to the entity.

Figure 15:
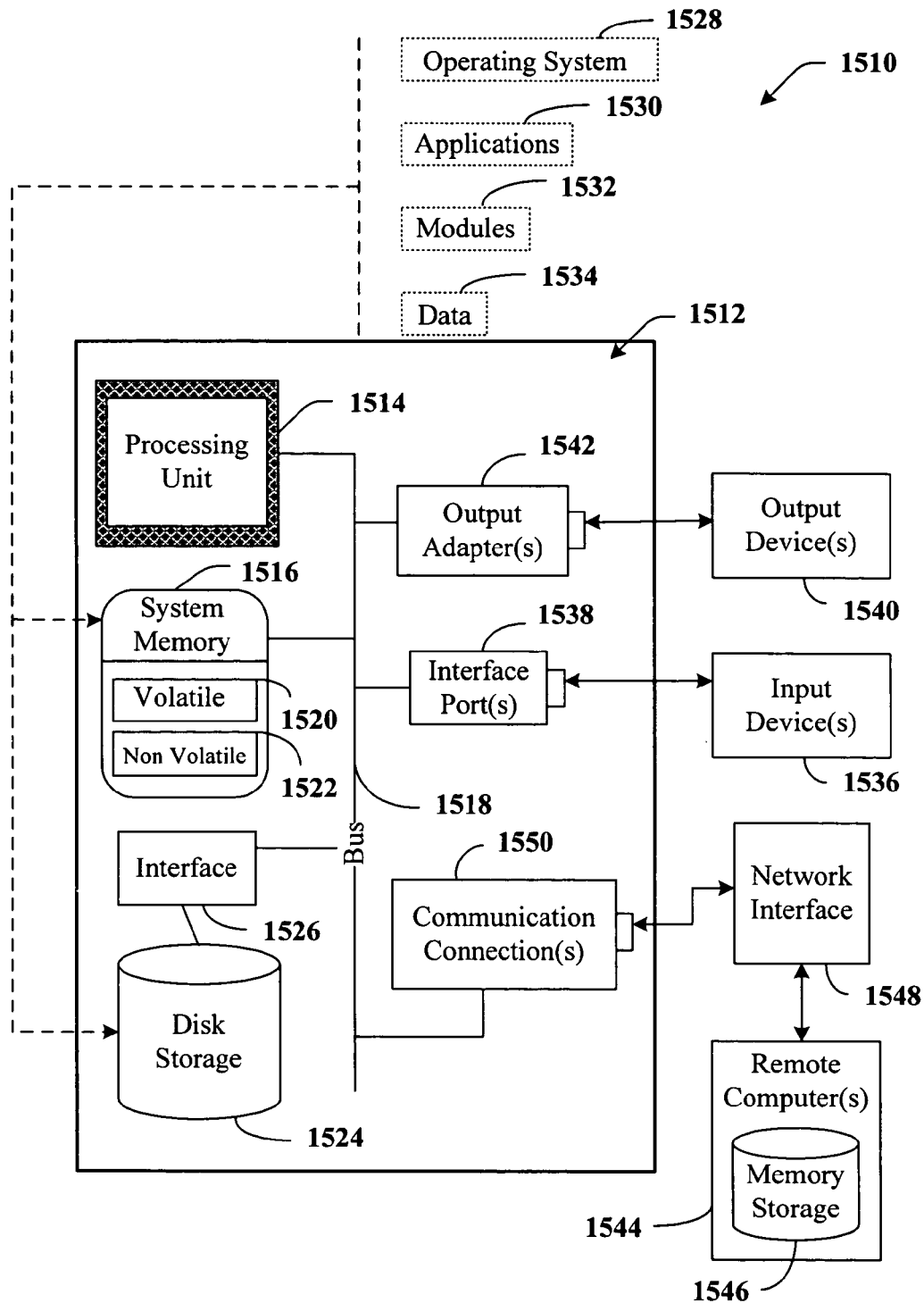
FIG. 15 illustrates an example operating environment in which the subject invention may function.

In order to provide additional context for various aspects of the subject invention, FIG. 15 and the following discussion are intended to provide a brief, general description of a suitable operating environment 1510 in which various aspects of the subject invention may be implemented. While the subject invention is described in the general context of computer-executable instructions, such as program modules, executed by one or more computers or other devices, those skilled in the art will recognize that the subject invention can also be implemented in combination with other program modules and/or as a combination of hardware and software. Generally, however, program modules include routines, programs, objects, components, data structures, etc. that perform particular tasks or implement particular data types. The operating environment 1510 is only one example of a suitable operating environment and is not intended to suggest any limitation as to the scope of use or functionality of the subject invention. Other well known computer systems, environments, and/or configurations that may be suitable for use with the subject invention include but are not limited to, personal computers, hand-held or laptop devices, multiprocessor systems, microprocessor-based systems, programmable consumer electronics, network PCs, minicomputers, mainframe computers, distributed computing environments that include the above systems or devices, and the like.

With reference to FIG. 15, an exemplary environment 1510 for implementing various aspects of the subject invention includes a computer 1512. The computer 1512 includes a processing unit 1514, a system memory 1516, and a system bus 1518. The system bus 1518 couples system components including, but not limited to, the system memory 1516 to the processing unit 1514. The processing unit 1514 can be any of various available processors. Dual microprocessors and other multiprocessor architectures also can be employed as the processing unit 1514.

The system bus 1518 can be any of several types of bus structure(s) including the memory bus or memory controller, a peripheral bus or external bus, and/or a local bus using any variety of available bus architectures including, but not limited to, an 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 1516 includes volatile memory 1520 and nonvolatile memory 1522. The basic input/output system (BIOS), containing the basic routines to transfer information between elements within the computer 1512, such as during start-up, is stored in nonvolatile memory 1522. By way of illustration, and not limitation, nonvolatile memory 1522 can include read only memory (ROM), programmable ROM (PROM), electrically programmable ROM (EPROM), electrically erasable ROM (EEPROM), or flash memory. Volatile memory 1520 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1512 also includes removable/nonremovable, volatile/nonvolatile computer storage media. FIG. 15 illustrates, for example a disk storage 1524. Disk storage 1524 includes, but is not limited to, devices like a magnetic disk drive, floppy disk drive, tape drive, Jaz drive, Zip drive, LS-100 drive, flash memory card, or memory stick. In addition, disk storage 1524 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1524 to the system bus 1518, a removable or non-removable interface is typically used such as interface 1526.

It is to be appreciated that FIG. 15 describes software that acts as an intermediary between users and the basic computer resources described in suitable operating environment 1510. Such software includes an operating system 1528. Operating system 1528, which can be stored on disk storage 1524, acts to control and allocate resources of the computer system 1512. System applications 1530 take advantage of the management of resources by operating system 1528 through program modules 1532 and program data 1534 stored either in system memory 1516 or on disk storage 1524. It is to be appreciated that the subject invention can be implemented with various operating systems or combinations of operating systems.

A user enters commands or information into the computer 1512 through input device(s) 1536. Input devices 1536 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1514 through the system bus 1518 via interface port(s) 1538. Interface port(s) 1538 include, for example, a serial port, a parallel port, a game port, and a universal serial bus (USB). Output device(s) 1540 use some of the same type of ports as input device(s) 1536. Thus, for example, a USB port may be used to provide input to computer 1512, and to output information from computer 1512 to an output device 1540. Output adapter 1542 is provided to illustrate that there are some output devices 1540 like monitors, speakers, and printers among other output devices 1540 that require special adapters. The output adapters 1542 include, by way of illustration and not limitation, video and sound cards that provide a means of connection between the output device 1540 and the system bus 1518. It should be noted that other devices and/or systems of devices provide both input and output capabilities such as remote computer(s) 1544.

Computer 1512 can operate in a networked environment using logical connections to one or more remote computers, such as remote computer(s) 1544. The remote computer(s) 1544 can be a personal computer, a server, a router, a network PC, a workstation, a microprocessor based appliance, a peer device or other common network node and the like, and typically includes many or all of the elements described relative to computer 1512. For purposes of brevity, only a memory storage device 1546 is illustrated with remote computer(s) 1544. Remote computer(s) 1544 is logically connected to computer 1512 through a network interface 1548 and then physically connected via communication connection 1550. Network interface 1548 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1550 refers to the hardware/software employed to connect the network interface 1548 to the bus 1518. While communication connection 1550 is shown for illustrative clarity inside computer 1512, it can also be external to computer 1512. The hardware/software necessary for connection to the network interface 1548 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates data binding between controls of a form and properties of an object of an object oriented programming language comprising:
   receiving information associated with introduction of a representation of an object onto a designer form stored in a computer readable storage medium, wherein the introduction of the representation of the object comprises a drag and drop of a representation of the object onto the form;
   determining one or more public properties of the object, including determining which public properties of the object are marked to indicate that no control should be created for the properties;
   automatically creating, labeling, and naming a control in the form for each of the one or more public properties of the object that are not marked to indicate that no control should be created for the property in accordance with the corresponding public property's name such that no control is automatically created, labeled, or named for any properties thus marked;
   automatically binding each control to the corresponding public property of the object;
   receiving information associated with introduction of a representation of a public property of the object that is marked to indicate that no control should be created for the property onto the designer form, wherein the introduction of the representation of the public property of the object comprises a drag and drop of a representation of the public property onto the form;
   automatically creating, labeling, and naming a control in the form for the public property that was dropped onto the form;
   automatically binding the control to the public property that was dropped onto the form, such that the control is created and bound to the public property even though the public property is marked to indicate that no control should be created for the property.

2. The method of claim 1, further comprising:
   receiving information associated with introduction of a representation of a public property of an object returned by a method of a Web Service, wherein the introduction of the representation of the public property comprises a drag and drop of the representation of the public property onto the form; and
   automatically creating, labeling, and naming a control in the form for the public property of the object returned by the method of the Web Service.

3. The method of claim 1 further comprising:
   receiving information associated with introduction of a representation of a public property of the object onto a designer form, wherein the introduction of the representation of the public property comprises a drag and drop of the representation of the public property onto an existing control of the form;
   automatically labeling and naming the existing control in accordance with the name of the public property; and
   automatically binding the existing control to the public property.

4. The method of claim 1 wherein the object includes sub-objects such that a control is created, labeled, and named for each public property of each sub-object, and bound to the corresponding public property of the corresponding sub-object.

5. A computer readable storage medium storing computer executable instructions which, when executed by a processor, implement a method comprising:

receiving information associated with introduction of a representation of an object onto a designer form stored in a computer readable storage medium, wherein the introduction of the representation of the object comprises a drag and drop of a representation of the object onto the form;

determining one or more public properties of the object, including determining which public properties of the object are marked to indicate that no control should be created for the properties;

automatically creating, labeling, and naming a control in the form for each of the one or more public properties of the object that are not marked to indicate that no control should be created for the property in accordance with the corresponding public property's name such that no control is automatically created, labeled, or named for any properties thus marked;

automatically binding each control to the corresponding public property of the object;

receiving information associated with introduction of a representation of a public property of the object that is marked to indicate that no control should be created for the property onto the designer form, wherein the introduction of the representation of the public property of the object comprises a drag and drop of a representation of the public property onto the form;

automatically creating, labeling, and naming a control in the form for the public property that was dropped onto the form;

automatically binding the control to the public property that was dropped onto the form, such that the control is created and bound to the public property even though the public property is marked to indicate that no control should be created for the property.

6. The computer readable storage medium of claim 5, further comprising:

receiving information associated with introduction of a representation of a public property of an object returned by a method of a Web Service, wherein the introduction of the representation of the public property comprises a drag and drop of the representation of the public property onto the form; and automatically creating, labeling, and naming a control in the form for the public property of the object returned by the method of the Web Service.

7. The computer readable storage medium of claim 5 wherein the object includes sub-objects such that a control is created, labeled, and named for each public property of each sub-object, and bound to the corresponding public property of the corresponding sub-object.

8. The computer readable storage medium of claim 5, further comprising:

receiving information associated with introduction of a representation of a public property of the object onto a designer form, wherein the introduction of the representation of the public property comprises a drag and drop of the representation of the public property onto an existing control of the form;

automatically labeling and naming the existing control in accordance with the name of the public property; and automatically binding the existing control to the public property.

* * * * *